Aug. 30, 1966 C. A. SECKERSON 3,269,760

FASTENERS

Filed Sept. 19, 1963

INVENTOR:

CLIFFORD ALEXANDER SECKERSON,

BY Gordon Needleman ATT'Y.

United States Patent Office 3,269,760

Patented August 30, 1966

3,269,760

FASTENERS

Clifford Alexander Seckerson, Iver Heath, England, assignor to United-Carr Incorporated, Boston, Mass., a corporation of Delaware Filed Sept. 19, 1963, Ser. No. 310,077
Claims priority, application Great Britain, Sept. 21, 1962, 36,040/62
1 Claim. (Cl. 287—90)

The present invention relates to an improved fastener which is particularly, although not exclusively, suitable for securing a ball-ended lever to a rod formed with a recess to receive the ball so as to permit limited universal movement of the lever relative to the rod.

According to the invention there is provided a fastener formed from a single strip of material to the shape of a split cylinder comprising a curved web and two arms defining an open mouth and having at least one projection extending inwardly and forwardly of the cylinder.

According to a further aspect of the invention there is provided an assembly of a ball-ended lever secured to a cylindrical rod formed with a recess adapted to receive the ball and an external circumferential groove with the aid of a fastener as defined in the preceding paragraph, wherein the ball is located in the recess and the fastener is engaged around the rod with the lever extending through the open mouth and the projection engaged in the groove in the rod and the dimensions of the open mouth are such that the ball is retained in the recess in the rod.

Figure 1:
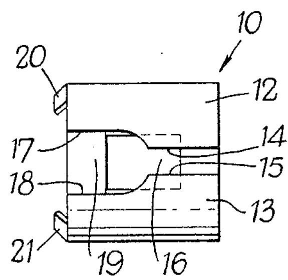
Figure 2:
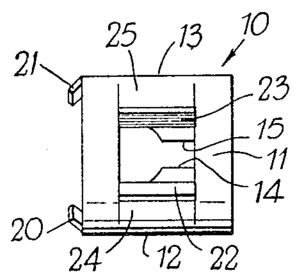
Figure 3:
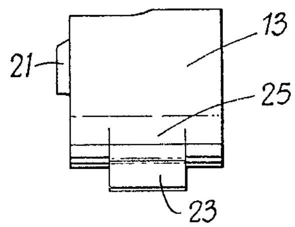
Figure 4:
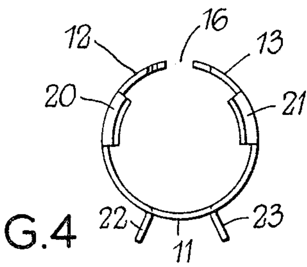
Figure 5:
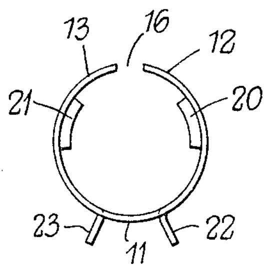
Figure 6:
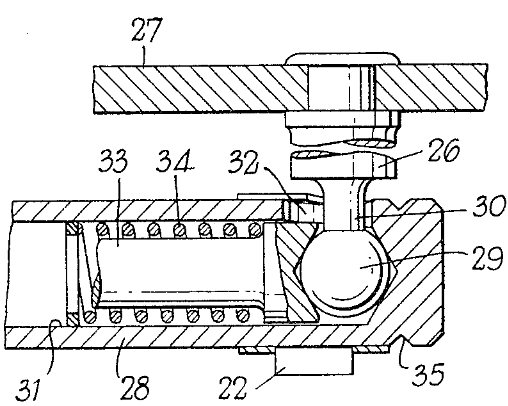

A preferred form of the invention will now be described with reference to the accompanying diagrammatic drawings, in which:

FIGURES 1, 2, 3, 4 and 5 are respectively a plan view, underplan, side elevation, front elevation and rear elevation of a fastener according to the invention, FIGURE 6 is a side elevation, partly in section of a ball-ended lever attached to an apertured shaft by means of the fastener of FIGURES 1 to 5, FIGURE 7 is a plan view of a modification of the fastener shown in FIGURES 1 to 5, and FIGURE 8 is a rear elevation of a further modification.

In FIGURES 1 to 5 a fastener is indicated generally at 10 which is preferably formed from a metal such as strip steel which is rendered resilient and, conveniently, rustproof after being manufactured to the shape shown. The fastener 10 is in the shape of a split cylinder and comprises a bowed web 11 which extends into a pair of similar bowed arms 12 and 13 respectively. The end edges 14 and 15 of the arms 12 and 13 respectively bound the open mouth 16 of the split cylinder.

Each end edge 14 and 15 of the arms has a cut-away portion 17 and 18 respectively so that the open mouth 16 has a wider portion 19.

A projection in the form of a lug 20 and 21 respectively is formed in the side edge of each arm 12 and 13 adjacent the wider portion 19 of the open mouth. The lugs 20 and 21 extend forwardly and are bent inwardly towards the axis of the fastener 10.

Two tongues 22 and 23 are sheared from the web 11 and their free ends are bent so as to be directed slightly away from each other and outwardly of the fastener.

The fastener 10 may be used conveniently to secure a ball-ended level to a recessed rod, as shown in FIGURE 6, so as to allow limited universal movement of the lever with respect to the rod.

In FIGURE 6 is shown a lever 26 which is attached at one end to a shaft 27 and at the other end to a rod 28. The lever 26 is attached to the shaft 27 in a known manner by passing the end of the lever, which is of reduced cross-section, through an aperture in the shaft and then peening the projecting end of the lever over to secure it to the shaft.

The other end of the lever 26 is formed with a spherical ball 29 which is attached to the lever by a neck 30 of substantially smaller diameter than the diameter of the spherical ball 29.

The rod 28, to which the lever 26 is attached, is formed with an axial stopped bore 31 and a radially extending circular recess 32 which runs into the bore 31. The recess 32 is of the same or slightly greater diameter than the ball 29.

A plunger 33 is located in the axial bore 31 and permanently urged by a spring 34 in the direction of the stopped end of the bore, and approximately adjacent the stopped end of the bore 31 the rod is formed with an external circumferential groove 35.

In order to secure the lever 26 to the rod 28 the ball 29 is inserted into the recess 32. The plunger 33, under the pressure of the spring 34, holds the ball 29 firmly against the end wall of the bore 31 as shown and the fastener 10 is snap-engaged around the rod into the position shown in which the lugs 20 and 21 engage in the external groove 35 in the shaft to prevent axial movement of the fastener along the rod and the neck of the lever extends through the wider portion 19 of the open mouth of the fastener.

In order to span-engage the fastener 10 into this position around the rod 28 the tongues 22 and 23 are squeezed together with the aid of a suitable tool, such as a pair of pliers, thus opening the mouth 16 and allowing the arms 12 and 13 to pass over and around the rod.

In the final assembly the lever 26 is free to pivot on the ball 29 within limits imposed by the wider portion 19 of the mouth of the fastener which surrounds and limits movement of the neck 30 of the lever.

Under normal operating conditions the plunger 33 holds the ball 29 firmly against the recessed end of the bore 31 and prevents it from being withdrawn from the recess 32. If, however, a force is exerted on the lever which is sufficient to overcome the spring urged plunger the ball is still prevented from coming out of the recess 32 by the ends of the arms 12 and 13 of the fastener which overlap the recess and thus retain the ball therein.

The fastener 10 can be removed from the rod and the joint dis-assembled by pinching the tongues 22 and 23 to open the mouth 16 sufficiently to allow the fastener to be withdrawn from the rod. The lever 26 is then drawn out of the recess 32 against the relatively weak resistance of the plunger 33.

Figure 7:
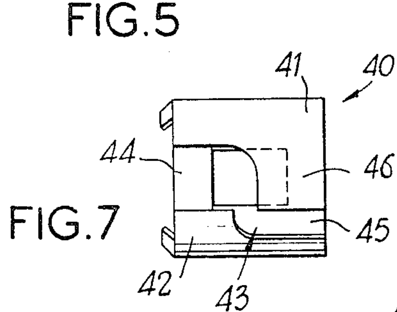

A modification of the fastener 10 is indicated generally at 40 in FIGURE 7.

The fastener 40 is similar to the fastener 10 except that the end edge of each arm 41 and 42 is sheared so as to provide an open mouth 43 therebetween which is substantially in the form of a bayonet slot having a wider portion 44 and a narrower portion 45 which is connected to but offset from the wider portion 44.

The arm 41 thus has a projection 46 which forms an abutment at the end of the wider portion 44 of the open mouth.

The fastener 40 is used in the same manner as the fastener 10. When the fastener 40 is engaged on the shaft 28 the projection 46 closes a part of the aperture 32 so as to prevent the ball 29 from being forced out of the shaft 28 and acts as an abutment limiting movement of the neck 30 of the lever 26.

The fastener 40 has the advantage over the fastener 10 that the narrower portion of the open mouth 43 can be wider than that of the open mouth 16 of the fastener 10 without any reduction of the safety margin.

This allows greater tolerance in the dimensions of the fastener 40 which makes it easier to manufacture.

If the fastener 10 or the fastener 40 is being used on a relatively thick-walled rod, the groove on the rod may be found on the opposite hand of the recess 32 to that shown in FIGURE 6 and the fastener 10 or 40 modified by forming the lugs on the opposite end of the fastener to that shown.

Figure 8:
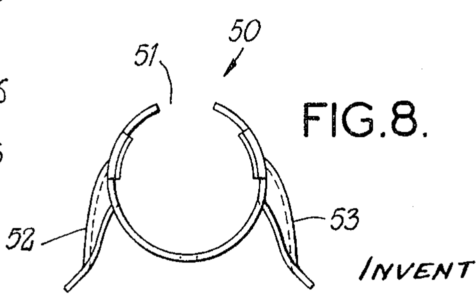

A further modification of the fastener 10 is indicated generally at 50 in FIGURE 8.

The fastener 50 is similar to the fastener 10 except that it has a parallel sided open mouth 51 and tongues 52 and 53 each of which has its root lying in the arm of the fastener.

The tongues 52 and 53 are substantially longer than the tongues 22 and 23 of the fastener 10 and enable greater leverage to be applied in opening the mouth 51.

What I claim is:

A resilient fastener for securing a ball-ended lever to an externally grooved and recessed cylindrical rod, in which the fastener is formed from a single strip of material in the shape of a split annular cylinder comprising a curved web and two curved arms, each of said arms having an end and said ends being spaced from each other, to define an open mouth, having a wider portion and a narrower portion which is axially offset therefrom and connected to said wider portion and in which the fastener has at least one lug extending forwardly and radially inwardly at one end of the cylinder, whereby the ball may be located in the recess and the fastener snap-engaged around the rod with the lug engaged in the groove in the rod, the lever extending through the open mouth and the ball held in the recess by the arms of the fastener in which a pair of tongues are sheared partly from the web and bent radially outwardly of the fastener, whereby compression of the tongues toward each other would open the said mouth of said fastener.

References Cited by the Examiner

UNITED STATES PATENTS

| | | | |
|---|---|---|---|
| 776,549 | 12/1904 | Redington | 24—259 |
| 1,603,504 | 10/1926 | Baltzley | 24—259 |
| 2,195,967 | 4/1940 | Liebmann | 24—259 X |
| 2,854,266 | 9/1958 | Dies. | |
| 2,859,060 | 11/1958 | Davies et al. | |
| 2,987,333 | 6/1961 | Lobdell. | |

FOREIGN PATENTS

| | | |
|---|---|---|
| 738,300 | 10/1932 | France |
| 8,192 | 4/1914 | Great Britain. |
| 323,976 | 1/1930 | Great Britain. |

CARL W. TOMLIN, *Primary Examiner.*

A. V. KUNDRAT, *Assistant Examiner.*